United States Patent
Zhou

(10) Patent No.: US 8,072,669 B2
(45) Date of Patent: Dec. 6, 2011

(54) METHODS AND APPARATUS FOR GENERATING 16-QAM-MODULATED OPTICAL SIGNAL

(75) Inventor: Xiang Zhou, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 12/553,082

(22) Filed: Sep. 2, 2009

(65) Prior Publication Data

US 2011/0051215 A1    Mar. 3, 2011

(51) Int. Cl.
G02B 26/00 (2006.01)
G02F 1/01 (2006.01)
G02F 1/035 (2006.01)

(52) U.S. Cl. .............................. 359/238; 359/279; 385/3

(58) Field of Classification Search .......... 359/237–238, 359/278–279, 315, 245, 247, 251–252, 254, 359/108, 290–292, 298, 300–302; 385/1–3, 385/40, 129–132, 5, 8–9
See application file for complete search history.

(56) References Cited

U.S. PATENT DOCUMENTS

| 7,260,332 B1 | 8/2007 | Hayee |
| 7,817,923 B2 * | 10/2010 | Akiyama et al. ............ 398/188 |
| 2005/0238367 A1 | 10/2005 | Chen et al. |
| 2008/0095486 A1 | 4/2008 | Shastri et al. |
| 2008/0239448 A1 * | 10/2008 | Tanaka et al. ............. 359/245 |
| 2009/0185810 A1 * | 7/2009 | Kaplan et al. ............. 398/184 |

FOREIGN PATENT DOCUMENTS

JP    2009 094988    4/2009

OTHER PUBLICATIONS

Bernasconi, P.G. et al., "1-Tb/s (6 × 170.6 Gb/s) Transmission Over 2000-km NZDF Using OTDM and RZ-DPSK Format", IEEE Photonics Technology Letters, vol. 15, No. 11, Nov. 2003.
PCT International Search Report corresponding to PCT Application PCT/US1010/002392 filed Sep. 1, 2010 (7 pages).
PCT Written Opinion of the International Searching Authority corresponding to PCT Application PCT/US1010/002392 filed Sep. 1, 2010 (4 pages).

* cited by examiner

*Primary Examiner* — Dawayne Pinkney

(57) ABSTRACT

A system and method for producing a 16-QAM-modulated signal are disclosed. The methodology, in an exemplary expedient, generally comprises splitting light from a CW laser into two parts; modulating the first part with a first signal and modulating the second part with a second signal; phase shifting the modulated second part by about $\pi/2$; combining the modulated first part with the phase shifted and modulated second part to produce a four-level modulated signal; phase modulating the four-level modulated signal with a third signal with a phase modulation of about $(0, \pi/2)$ to produce an 8-QAM-modulated signal, and thereafter modulating that signal with a fourth signal with a phase-modulation of about $(0, \pi)$ to produce the 16-QAM-modulated signal.

9 Claims, 5 Drawing Sheets

METHODS AND APPARATUS FOR GENERATING 16-QAM-MODULATED OPTICAL SIGNAL

FIELD OF THE DISCLOSURE

The present disclosure relates generally to communication networks, and more particularly, to converting binary electrical signals into a single sixteen-level quadrature-amplitude-modulated (16-QAM) optical signal.

BACKGROUND

Wave division multiplexing (WDM) optical networks are well known. A WDM channel is typically transmitted by a single mode semiconductor laser, where information to be communicated is imposed on the light by modulating the laser current or by externally modulating the light by applying a voltage to a modulator coupled to the laser source. A receiver subsequently photo-detects and converts the light into electric current either by direct or coherent detection.

Due to the rapid growth of optical networks and the need for greater capacity, significant research has focused on finding efficient multi-level optical modulation formats. Any digital modulation scheme uses a finite number of distinct signals to represent digital data. Phase-shift-keying (PSK) uses a finite number of phases; each assigned a unique pattern of binary bits. Usually, each phase encodes an equal number of bits, and each pattern of bits forms the symbol that is represented by the particular phase. The demodulator, which is designed specifically for the symbol-set used by the modulator, determines the phase of the received signal and maps it back to the symbol it represents, thereby recovering the original data. The receiver compares the phase of the received signal to a reference signal. This expedient utilizes coherent detection and is referred to as CPSK.

Alternatively, in lieu of using the bit patterns to establish the phase of the wave, CPSK employs differential phase changes. The demodulator then determines these phase changes in lieu of the actual phase of the signal. This scheme is referred to as differential phase-shift keying (DPSK), and is easier to implement than PSK as there is no need for the demodulator to maintain the reference signal to determine the exact phase of the received signal.

BPSK (also sometimes called PRK, Phase Reversal Keying) is the simplest form of PSK. It utilizes a pair of phases separated by 180° and is known as 2-PSK.

Quaternary or quadriphase PSK, 4-PSK, or 4-QAM (QPSK) uses four points on a constellation diagram as is known in the art. The four-phase QPSK can encode two bits per symbol—twice the rate of BPSK—and experimentation has demonstrated that this may double the data rate compared to a BPSK system while maintaining the bandwidth of the signal. Alternatively, QPSK can maintain the data-rate of BPSK at half the requisite bandwidth.

Optical modulations based on four-level quadrature-phase-shift-key (QPSK) have been effectively demonstrated for both 40 Gb/s and 100 Gb/s optical transmission. In the quest for even higher spectral efficiency, eight-level 8-PSK modulation has been proposed and demonstrated experimentally.

8-QAM is another eight-level modulation format. In comparison to 8-PSK, 8-QAM is tolerant of greater noise (on the order of 1.6 dB), with identical spectral utilization.

Optical modulation formats based on 4-ary quadrature-phase-shift-key (QPSK) and 8-PSK have already been demonstrated for 100 Gb/s optical transmission are discussed in the publications by Xiang Zhou, Jianjun Yu, Mein Du, and Guodong Zhang, "2 Tb/s (20×107 Gb/s) RZ-DQPSK straight-line transmission over 1005 km of standard single mode fiber (SSMF) without Raman amplification," *OFC* 2008, paper OMQ3; P. J. Winzer, G. Raybon, S. Chandrasekhar, C. D. Doerr, T. Kawanishi, T. Sakamoto, K. Higuma, "10×107 Gb/s NRZ-DQPSK transmission at 1.0 b/s/Hz over 12×100 km including 6 optical routing nodes," *Proc.OFC*2007, Anaheim, Calif., 2007, PDP 24; Xiang Zhou, Jianjun Yu, Dayou Qian, Ting Wang, Guodong Zhang, and P. D. Magill, "8×114 Gb/s, 25-GHz-spaced, PolMux-RZ-8PSK transmission over 640 km of SSMF employing digital coherent detection and EDFA-only amplification," *OFC* 2008, PDP1; and M. Seimetz, L. Molle, D.-D. Gross, B. Auth, R. Freund, "Coherent RZ-8PSK transmission at 30 Gb/s over 1200 km employing Homodyne detection with digital carrier phase estimation," *Proc. ECOC*2007, Berlin, September 2007, paper We 8.3.4, Rectangular 16-QAM has been shown to be a very attractive modulation format to further increase the spectral efficiency as disclosed in Joseph M. Kahn and Keang-Po Ho, "Spectral Efficiency Limits and Modulation/Detection Techniques for DWDM Systems," *IEEE Journal of Selected Topics in Quantum Electronics*, Vol. 10, No. 2, March/April 2004, pp. 259-272. As shown by Kahn, rectangular 16-QAM can increase the spectral efficiency (SE) by 33% over 8-PSK while only introducing a 0.5 dB noise penalty.

A method to generate rectangular 16-QAM optical signals is proposed by Y. Mori, C. Zhang, K. Igarashi, K. Katoh, K. Kikuchi, "Unrepeated 200-km Transmission of 40-Gbit/s 16-QAM Signals using Digital Coherent Optical Receiver," *OECC* 2008, 2008, PDP 4; and P. J. Winzer, A. H. Gnauck, "112 Gb/s Polarization-Multiplexed 16-QAM on a 25-GHz WDM Grid," *ECOC* 2008, 2008, paper Th.3.E.5, The method uses a digital or analogue method to generate two multilevel electrical signals which are then used to drive a dual parallel Mach-Zehnder modulator (MZM). At present, the generation of high-speed multilevel electrical signals is still quite difficult and may be very expensive due to the need of broadband linear electrical power amplifiers.

Another method to also generate rectangular 16-QAM optical signals is proposed T. Sakamoto et al, *ECOC* '07, PD2.8, 2007. The method uses four binary electrical signals to drive a quadparallel MZM, which consists of two amplitude-asymmetric dualparallel MZMs in a parallel configuration. In addition, very accurate phase and polarization control of the two amplitude asymmetric dual-parallel MZMs are required, which may also be a potential problem for the practical application. In fact, quad-parallel is still not commercially available yet.

SUMMARY

In accordance with a first aspect of the disclosure, an apparatus is disclosed for producing a 16-QAM-modulated signal. The apparatus comprises a first coupler that receives light from a CW laser and splits the light into two. The split lightwaves are independently received by a first modulator that modulates the first part with a first signal and a second modulator that receives and modulates the second part with a second signal, respectively. The second modulator outputs a signal to a phase shifter that shifts a phase of the modulated second part by approximately $\pi/2$. The first and second parts are combined at a second coupler to produce a four-level modulated signal, which is further modulated with a third signal with a phase modulation of about $(0, \pi/2)$ to produce an 8-QAM modulated signal. The output of this phase modulation step is further modulated with a fourth-signal to produce a 16-QAM-modulated signal. The first and second modulators are preferably phase-asymmetric Mach-Zehnder (MZ) modulators, and the third modulator is either an MZ or phase modulator.

In accordance with another aspect of the disclosure, a method for producing a 16-QAM-modulated signal is provided. This method comprises: splitting light from a laser into two parts and modulating the first part with a first signal and modulating the second part with a second signal. The second part is then phase shifted by approximately $\pi/2$, and the modulated first part and phase shifted and modulated second part are combined to produce a four-level modulated signal. This signal is again modulated with a third signal with a phase modulation of about $(0, \pi/2)$ to produce an 8-QAM-modulated signal, which is then further modulated with a fourth signal with a phase modulation of about $0/\pi$ to produce a 16-QAM-modulated signal.

These aspects of the invention and further aspects and advantages thereof will become apparent to those skilled in the art as the present invention is described with particular reference to the accompanying drawings.

DETAILED DESCRIPTION

Embodiments will be described with reference to the accompanying drawing figures wherein like numbers represent like elements throughout to the extent possible. Before embodiments are explained in detail, it is to be understood that the disclosure is not limited in its application to the details of the examples set forth in the following description or illustrated in the figures. The disclosure suggests other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
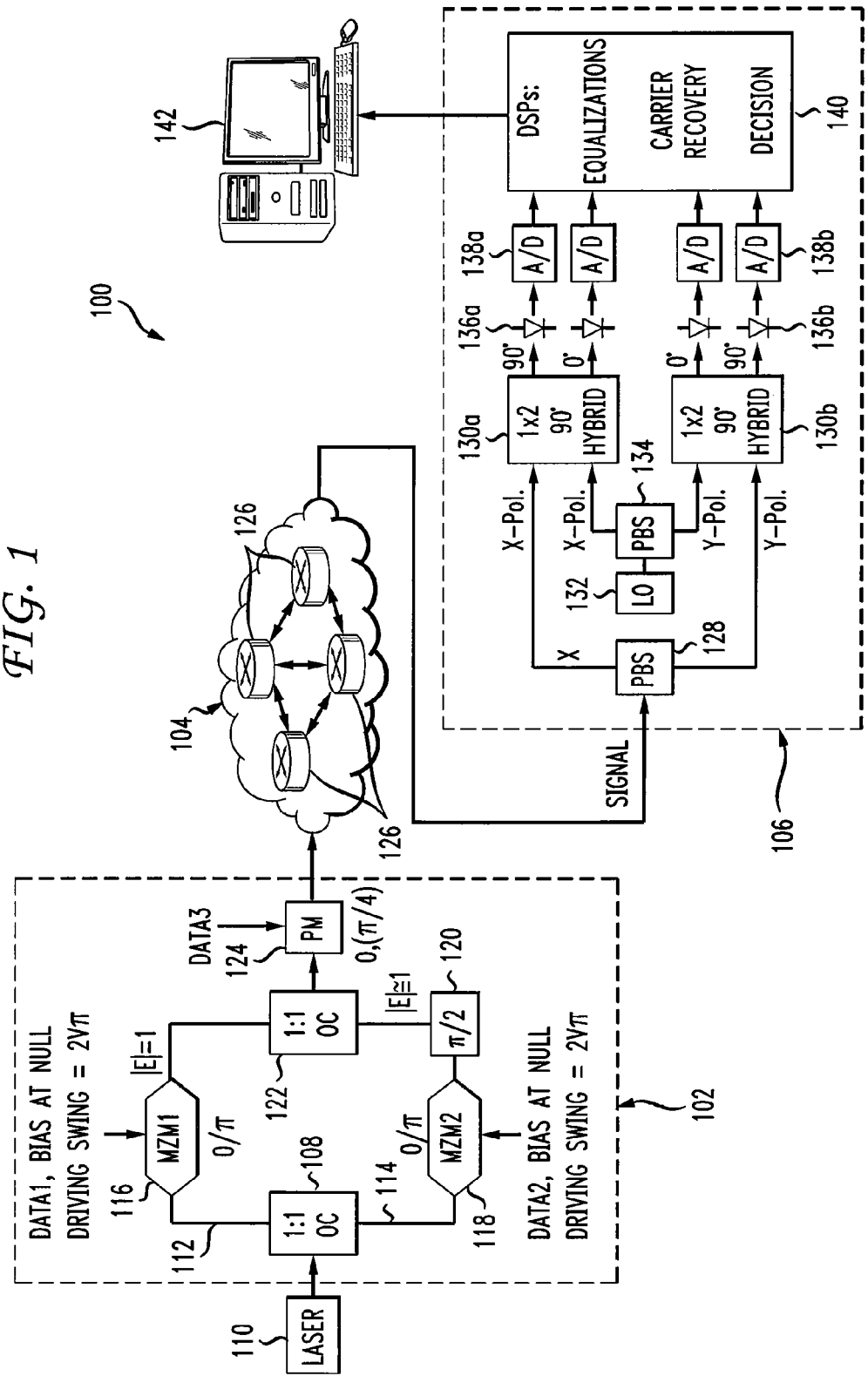
FIG. 1 is a high-level schematic of a representative optical network for carrying out aspects of the disclosure.

FIG. 1 is a schematic of the general architecture of a conventional optical network 100, which comprises a modulator 102, an intermediate optical communications network represented by network cloud 104 and a photo-detection system 106 that receives and converts the light waves to electrical signals. The modulator 102 comprises an optical splitter 108 that splits the incoming light from a Continuous Wave (CW) laser source 110 into two components—a first part 112 and a second part 114. The first and second parts 112, 114 are modulated by Mach-Zehnder Modulators MZM1 116 and MZM2 118, which are driven by binary signals DATA1 and DATA2, respectively, and biased at the null point with a driving swing of $2V\pi$. The modulated second part from MZM2 118 is applied to a phase shifter 120 to impose a phase shift of $\pi/2$. The modulated first part 112 and modulated and phase-shifted lower part are combined by a 1:1 optical combiner 122 and the output thereof subsequently phase-modulated by $(0, \pi/4)$ with binary signal DATA3 at phase-modulator 124 to produce the modulated output signal, in this example 8-QAM.

The exemplary photo-detection system 106 of FIG. 1 applies an incoming optical signal to a polarization beam splitter 128. The x-polarization is applied to a 1×2 90° phase and polarization hybrid 130a and the y-polarization to 1×2 90° phase and polarization hybrid 130b. A Local Oscillator (LO) 132 is coupled to a polarization beam splitter 134 such that the x-polarization is applied to hybrid 130a and the y-polarization to hybrid 130b. Each hybrid 130a, 130b has two outputs with two respective polarization states. The top two outputs have the LO in one state of polarization (horizontal) and the lower two outputs have the LO in the orthogonal state of polarization. These are received by a plurality of photo-detectors 136a and 136b, respectively, which output a corresponding photocurrent. The respective signals are 90° out of phase from each other and sampled by four analog-to-digital (A/D) converters 138a, 138b, respectively. The sample values are processed by a digital signal processor (DSP) 140 into output which can be sent to a network access device, a personal computer 142 as in this example.

Figure 2:
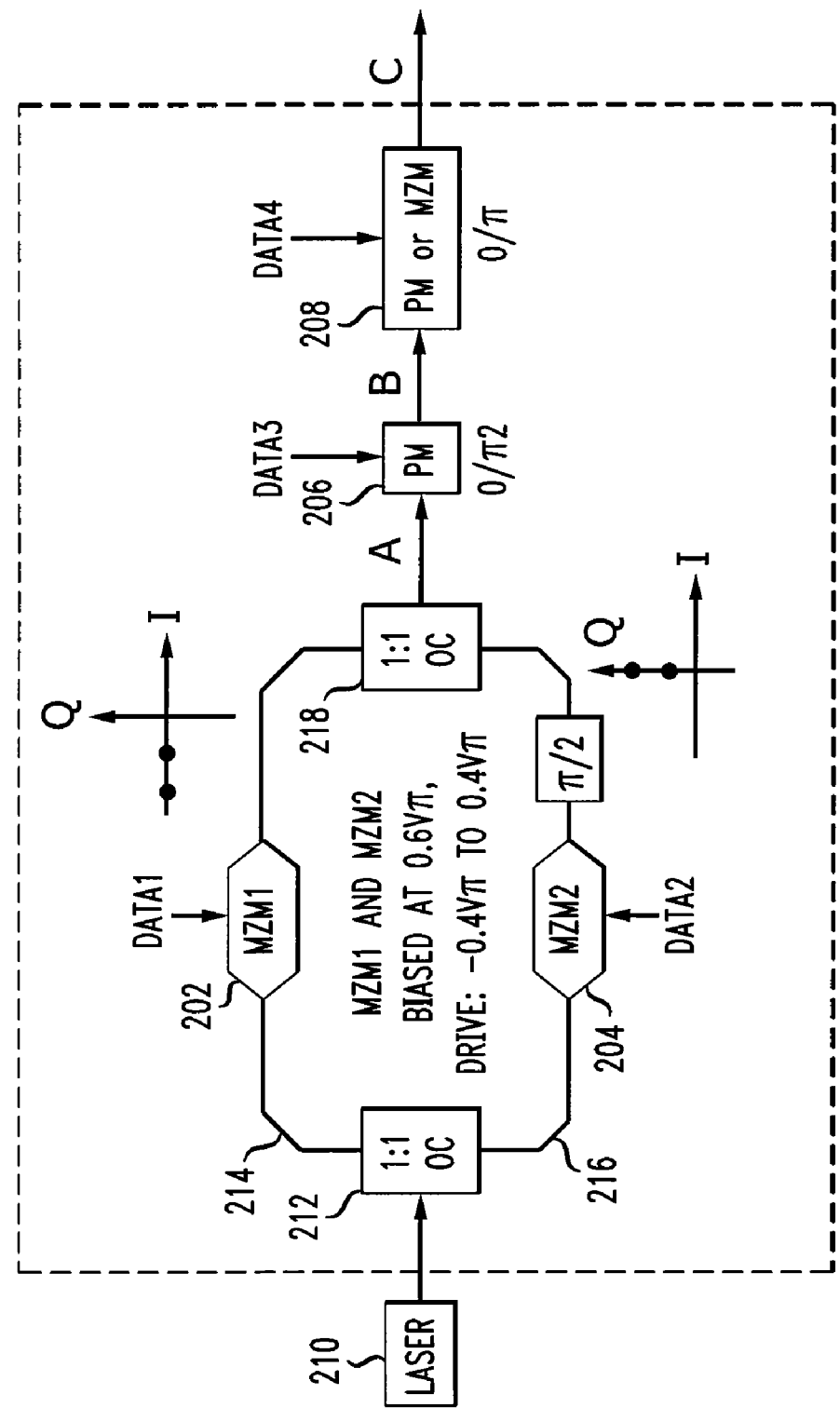
FIG. 2 is a schematic of a first exemplary embodiment of an apparatus for creating a rectangular 16-QAM optical signal.

FIG. 2 is a schematic of an exemplary embodiment of an apparatus 200 for creating a rectangular 16-QAM optical signal. The illustrative configuration employs a dual-parallel MZM, followed by two regular phase modulators in a serial configuration, driven by four binary electrical signals. The exemplary modulator 200 comprises $\pi/2$-biased dual-parallel MZMs 202, 204, a $(0, \pi/2)$ phase modulator 206, and a $(0, \pi)$ phase modulator 208. The $(0, \pi)$ phase modulator 208 is a phase modulator of the type known to those skilled in the art, or it may be a MZM-based phase modulator, which is biased at the null point with a $2V\pi$ peak-to-peak driving swing. Incoming light from a CW laser source 210 is split by an optical splitter 212 into two components—a first part 214 and a second part 216. The first and second parts 214, 216 are modulated by MZM1 202 and MZM2 204, both biased at $0.6V\pi$ with a peak-to-peak driving swing of $0.8V\pi$. Alternatively, a bias of $1.2V\pi$ with a $0.8V\pi$ peak-to-peak driving swing may be employed. Utilizing the driving setting on the MZMs as described in the foregoing, the optical signals are joined at an optical combiner 218, the output of which is represented by "A", an offset rectangular 4-QAM signal. After these offset 4-QAM optical signals are applied to a $(0, \pi/2)$ PM 206, the output of which is represented by "B", an offset rectangular 8-QAM signal. The offset 8-QAM optical signals are subsequently processed through a $(0, \pi)$ PM or MZM 208, the output of which is represented by "C", a standard rectangular 16-QAM signal. This signal 224 may then be transmitted via any methodology known by those skilled in the art, into a communications network.

Figure 3A:
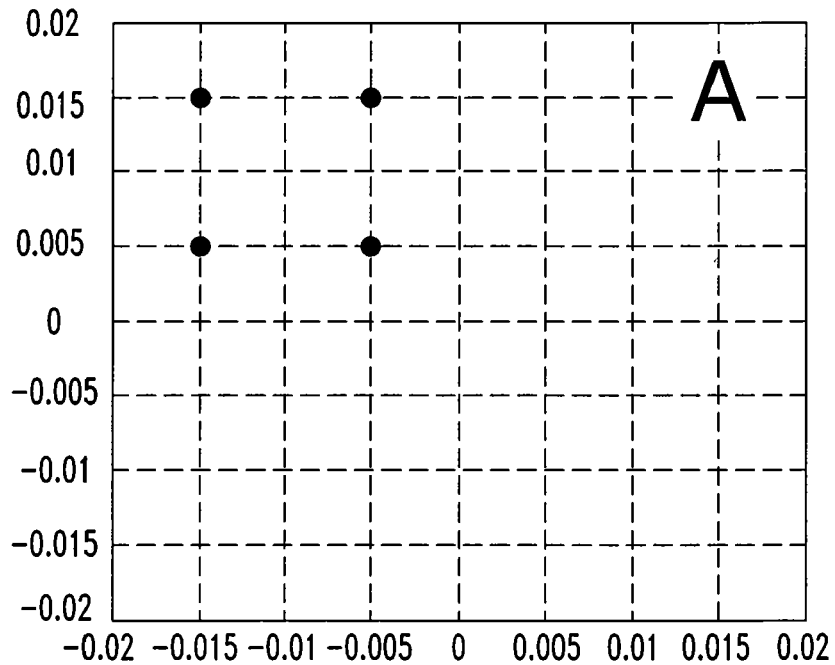
FIG. 3a is a simulated I-Q constellation diagram after the dual-parallel MZMs.
Figure 3B:
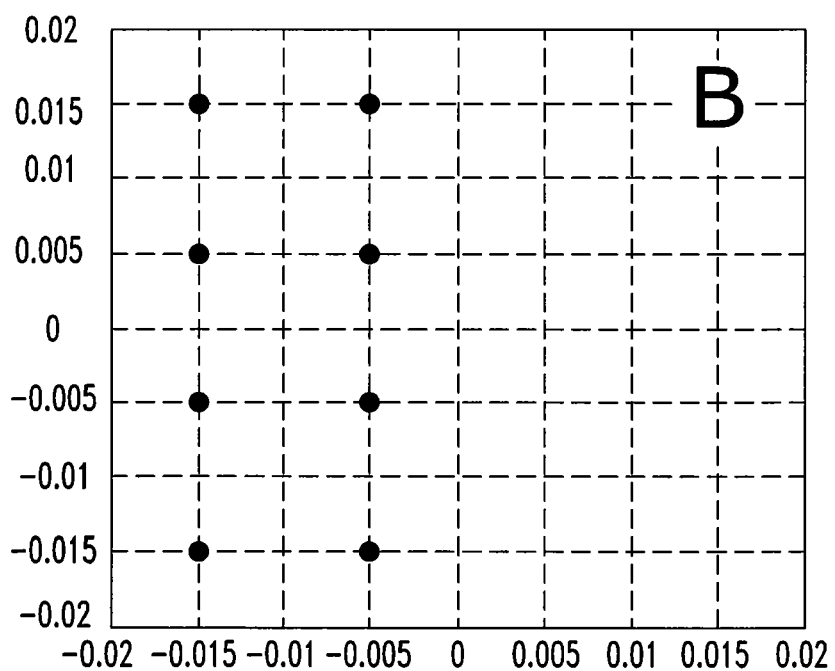
FIG. 3b is a simulated I-Q constellation diagram after the $(0, \pi/2)$ phase modulation.
Figure 3C:
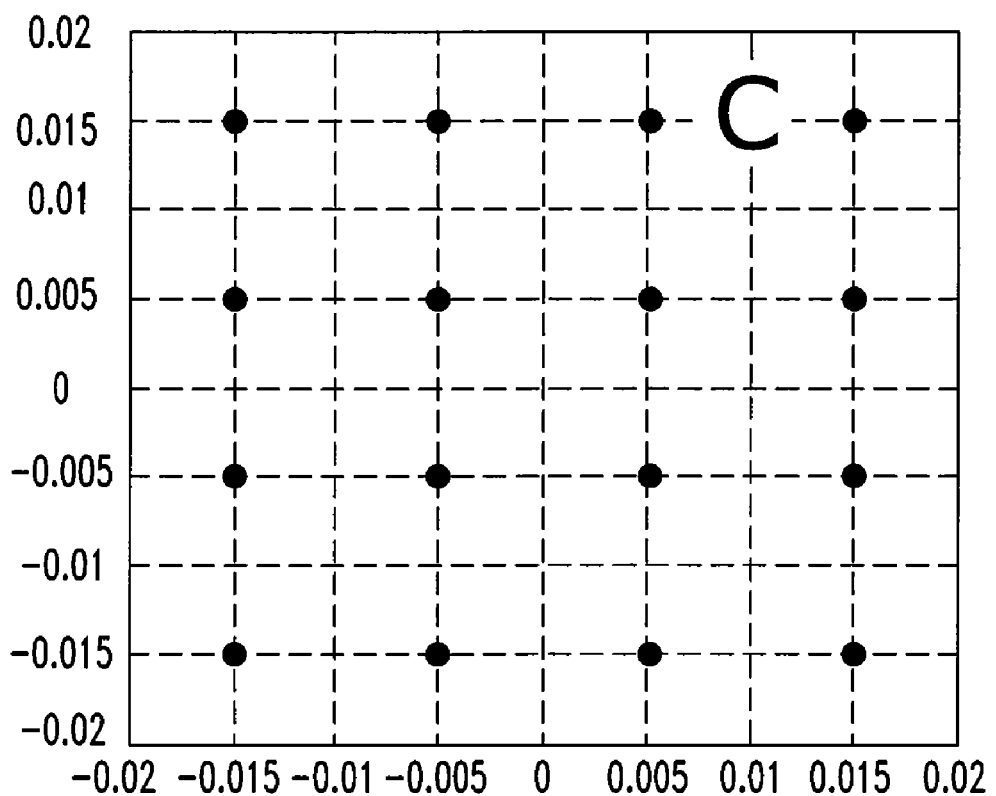
FIG. 3c is a simulated I-Q constellation diagram after the $(0, \pi)$ phase modulation.

FIGS. 3a, 3b and 3c depict simulated I-Q constellation diagrams of "A" from FIG. 2 (after the dual-parallel MZMs 202, 204 and OC 218), "B" from FIG. 2 (after the $(0, \pi/2)$ phase modulator 206), and "C" from FIG. 2 (after the $(0, \pi)$ phase modulator 208), respectively. The simulated results shown in FIG. 3 are all based on a numerical simulation assuming a 0.7 symbol rate of 3-dB modulator bandwidth, and that all modulators and their driving circuits have a fist-order Gauss filter response with identical bandwidth.

All the required optical components in the rectangular 16-QAM modulator (dual-parallel MZM, PM and common MZM) disclosed herein and shown in FIG. 2 are commercially available for up to a 30 GHz bandwidth. Therefore, by combining polarization division multiplexing (PDM), the disclosed method can generate a single-carrier PDM-16-QAM optical signal with a bit rate greater than 200 Gb/s.

In summary, rectangular 16-QAM is a promising modulation format for transmission systems operating at 100 Gb/s and above due to high spectral efficiency and optimal noise performance. The methodology disclosed herein allows a 16-QAM optical signal to be generated using commercially available optical modulators with binary electrical drive signals. By combining the same with polarization division multiplexing, the 16-QAM modulator can be used to generate an optical signal carrying data with a bit rate greater than 200 Gb/s per wavelength. This is very difficult to realize using existing 16-QAM generation methods. Increasing data rate per wavelength and spectral efficiency has historically been shown to be an effective method to reduce cost per transmitted bit because fiber and optical components can be shared over more capacity.

Figure 4:
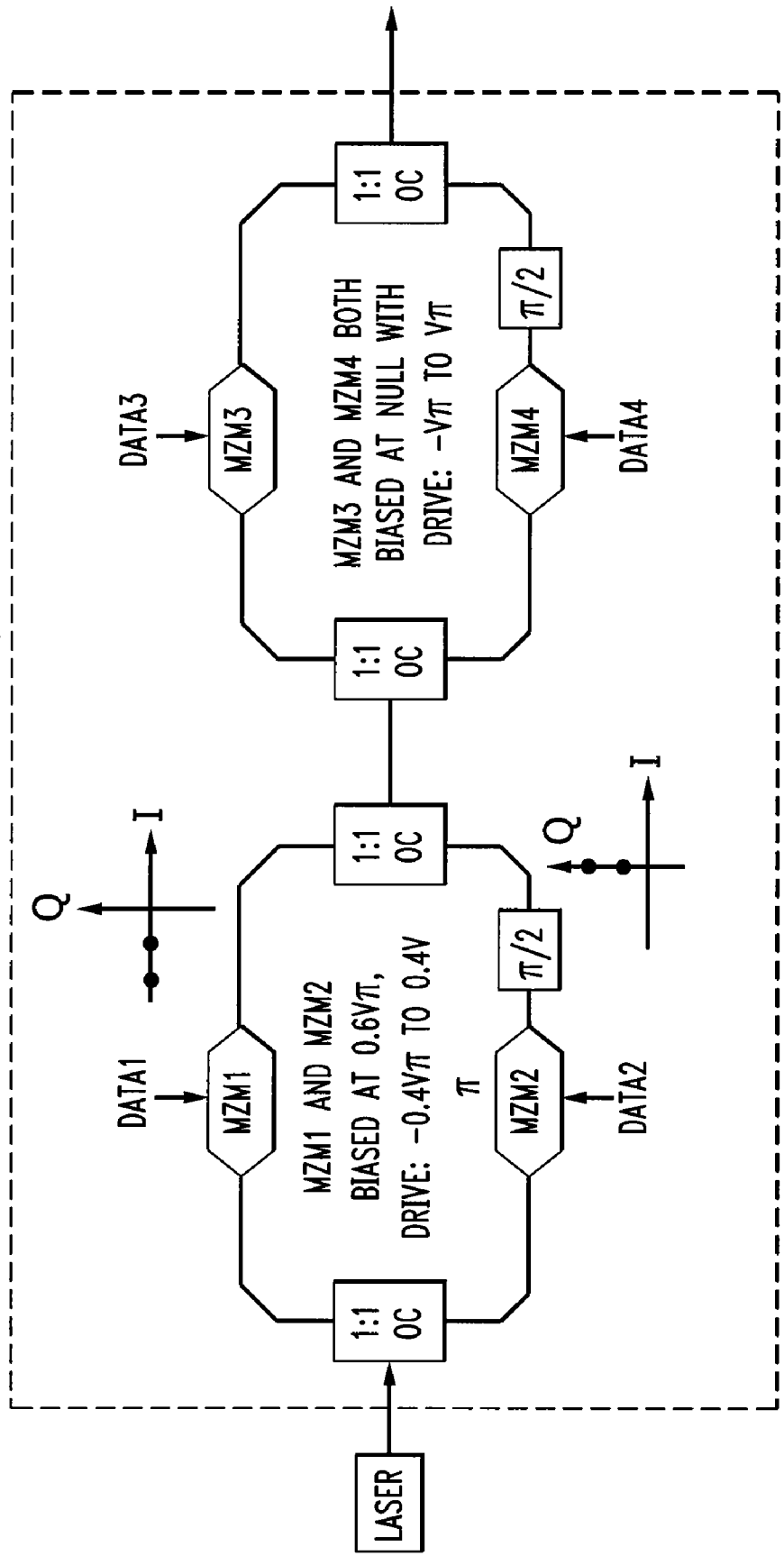
FIG. 4 is a modified implementation of a rectangular 16-QAM modulator.

Note that the two cascaded phase modulators shown in FIG. 2 (206 and 208) form a serial QPSK modulator. Because QPSK modulation can also be implemented by a π/2-biased dual-parallel MZM modulator with both child MZMs biased at the null point but with full Vπ driving swing (i.e. the common parallel QPSK modulator), a modified 16 QAM modulator can be constructed by replacing the serial QPSK modulator by a parallel QPSK modulator as is shown in FIG. 4. The 16 QAM modulator shown in FIG. 4 is more complex than that shown in FIG. 2 but may achieve better performance if the modulator bandwidth is limited, which is usually true for very high-speed optical communication systems.

The foregoing detailed description is to be understood as being in every respect illustrative and exemplary, but not restrictive, and the scope of the disclosure discussed herein is not to be determined from the description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure.

I claim:

1. An apparatus, comprising:
    a first coupler that receives light and splits the light into a first part and a second part;
    a first modulator that modulates the first part with a first signal to produce a modulated first part and a second modulator that modulates the second part with a second signal to produce a modulated second part;
    a phase shifter that shifts a phase of the modulated second part by π/2 to produce a phase shifted modulated second part;
    a second coupler that combines the modulated first part with the phase shifted modulated second part to produce a four-level modulated signal;
    a phase modulator that further modulates the four-level modulated signal with a third signal with a phase modulation of (0, π/2) to produce an 8-quadrature amplitude modulation signal; and
    a third modulator that further modulates the 8-quadrature amplitude modulation signal with a fourth signal to produce a 16-quadrature amplitude modulation signal.

2. The apparatus according to claim 1, wherein the first modulator and the second modulator each comprises a Mach-Zehnder optical modulator.

3. The apparatus according to claim 1, wherein the first coupler and the second coupler each comprises a 3dB (1:1) optical coupler.

4. The apparatus according to claim 1, wherein the first modulator is biased at a null point and driven by the first signal with a driving swing of 0.6Vπ, and the second modulator is biased at a null point and driven by the second signal with a driving swing in the range of −0.4Vπ to +0.4Vπ.

5. The apparatus according to claim 1, wherein the phase modulator is driven by the third signal with a phase modulation equal to approximately (0, π/2).

6. The apparatus according to claim 1, wherein the first signal, the second signal, and the third signal are binary electrical signals.

7. A method for producing a 16-quadrature amplitude modulation signal, comprising:
    splitting light into a first part and a second part;
    modulating the first part with a first signal to produce a modulated first part and modulating the second part with a second signal to produce a modulated second part;
    phase shifting the modulated second part by π/2 to produce a phase shifted modulated second part;
    combining the modulated first part with the phase shifted modulated second part to produce a four-level modulated signal;
    phase modulating the four-level modulated signal with a third signal with a phase modulation of (0, π/2) to produce an 8-quadrature amplitude modulation signal; and
    further modulating the 8-quadrature amplitude modulation signal with a fourth signal with a phase modulation of (0, π) to produce a 16-quadrature amplitude modulation signal.

8. The method according to claim 7, further comprising attenuating the phase shifted and modulated second part.

9. The method according to claim 7, further comprising biasing a first modulator at a null point and driving the first modulator by the first signal with a driving swing of 0.6Vπ, and biasing the second modulator at a null point and driving the second modulator with the second signal with a driving swing in the range of −0.4Vπ to +0.4Vπ.

* * * * *